(12) United States Patent
Stewart (10) Patent No.: US 9,227,250 B2
(45) Date of Patent: Jan. 5, 2016

(54) GUN BARREL MANUFACTURING PROCESS

(71) Applicant: Engineering Technologies & Manufacturing Ltd., Preston Lancashire (GB)

(72) Inventor: James Anthony Stewart, Preston (GB)

(73) Assignee: Engineering Technologies & Manufacturing LTD., Preston, Lancashire (GB)

( * ) Notice: Subject to any disclaimer, the term of this patent is extended or adjusted under 35 U.S.C. 154(b) by 0 days.

(21) Appl. No.: 14/013,726

(22) Filed: Aug. 29, 2013

(65) Prior Publication Data

US 2015/0059565 A1  Mar. 5, 2015

(51) Int. Cl.
| | |
|---|---|
| *B64D 1/04* | (2006.01) |
| *B23B 35/00* | (2006.01) |
| *F41A 21/06* | (2006.01) |
| *F41A 21/08* | (2006.01) |
| *B23P 15/00* | (2006.01) |

(52) U.S. Cl.
CPC ............... *B23B 35/00* (2013.01); *F41A 21/06* (2013.01); *F41A 21/08* (2013.01); *B23B 2215/28* (2013.01); *B23P 15/00* (2013.01)

(58) Field of Classification Search
USPC ......... 89/1.41, 14.8, 16, 14.05, 14.7; 42/76.1, 42/76.02
See application file for complete search history.

(56) References Cited

U.S. PATENT DOCUMENTS

| | | | | |
|---|---|---|---|---|
| 441,389 | A | * | 11/1890 | Brooks ............................ 42/40 |
| 490,614 | A | * | 1/1893 | Redwine ........................... 42/77 |
| 3,159,903 | A | * | 12/1964 | Eves .............................. 89/14.8 |
| 4,644,845 | A | * | 2/1987 | Garehime, Jr. ............... 89/41.05 |
| 5,856,631 | A | * | 1/1999 | Julien ............................. 89/16 |
| 6,615,702 | B1 | * | 9/2003 | Julien ............................. 89/16 |
| 7,383,656 | B2 | | 6/2008 | Bojalad et al. |
| 7,707,761 | B2 | | 5/2010 | Bojalad et al. |
| 7,934,332 | B2 | * | 5/2011 | Briggs ........................ 42/76.02 |
| 2010/0236122 | A1 | * | 9/2010 | Fonte ............................ 42/76.1 |
| 2010/0307045 | A1 | * | 12/2010 | Taylor ........................... 42/76.1 |

FOREIGN PATENT DOCUMENTS

| | | |
|---|---|---|
| GB | 1645 | 0/1857 |
| GB | 8903 | 0/1895 |

* cited by examiner

*Primary Examiner* — Michelle R Clement
(74) *Attorney, Agent, or Firm* — Tarolli, Sundheim, Covell & Tummino LLP (57) ABSTRACT

Disclosed herein is a method of manufacturing two or more gun barrels, the method comprising: machining (103) a single metal block to form a barrel preform having the outer shape of at least a first gun barrel and a second gun barrel; drilling (105) a first hole through the first gun barrel to form a first barrel bore; and drilling (107) a second hole through the second gun barrel to form a second barrel bore. Advantages include the barrels being integrally attached to each other and so a soldering operation to attach the barrels to each other is avoided.

23 Claims, 10 Drawing Sheets

GUN BARREL MANUFACTURING PROCESS

FIELD OF THE INVENTION

The present invention relates to a method of manufacturing gun barrels Embodiments allow gun barrels to be made straighter, smoother, and closer together than gun barrels manufactured with known techniques. The accuracy and usability of the gun barrels are thereby improved.

BACKGROUND TO THE INVENTION

Guns have many sporting applications. For example, shotgun shooting is a multi-event Olympic sport that is growing in popularity. Competitive rifle shooting is also a well established sporting activity.

The least powerful guns used in competitive shooting are airguns. These fire a pellet that is powered by compressed air. The range of a fired pellet is typically 30 m or less, and so airguns are only suitable for short range shooting.

Guns with longer ranges fire ammunition powered by gun powder. A shotgun fires cartridges in which a plurality of pellets are fired in a spread pattern from the gun. Shotguns are typically used for shooting targets in the air at a range of about 50 m. Rifles fire a single bullet and have a much longer range than shotguns. For example, a .308 Winchester rifle may hit a target 1000 m away.

Shotguns are typically provided with two barrels. In an over-and-under configuration, one barrel is directly above the other in use. In a side-by-side configuration, the barrels are horizontally adjacent to each other in use. Shotguns with more than two barrels are also known, as are rifles with a plurality of barrels.

The accuracy of a gun, in particular shotguns and rifles that are required to operate at relatively long ranges, is a critical performance measure.

For every gun, a factor that influences its accuracy is the straightness, and smoothness, of the gun barrel. The accuracy of a shot, and the consistency of the placement of the shot, both improve as the straightness and smoothness of a barrel are increased.

The usability of a gun is also highly influential on its accuracy. In particular with shotguns, a gun with a large perceived recoil requires the user to compensate for the effect of the recoil with their shooting technique. A large perceived recoil is also unpleasant for the user and requires the user to recover from the recoil prior to firing the gun again.

In known manufacturing techniques of guns with more than one barrel, each barrel is formed separately. Each barrel is formed by drilling a single hole through a metal block and then forming the outside of the barrel, for example, by turning the barrel on a lathe. The two formed barrels are then soldered together with the barrels spaced apart by a central rib.

A problem with such known manufacturing techniques is that the soldering operation heat treats the metal barrels and thereby degrades their straightness. This reduces the accuracy of each barrel.

A further problem is that the rib imposes a minimum spacing of the barrels. To compensate for the reduced accuracy introduced by the barrel spacing, the barrels are angled towards each other. This is necessary to ensure that, for a particular aim of the gun, projectiles fired from each barrel will be fired into the same position at a pre-determined distance from the gun. However, the angling of the barrels towards each other increases the perceived recoil from the gun. since the angling of the barrels imparts a sideways momentum on the butt of the gun after the gun has been fired.

Accordingly, a number of problems exist with gun barrels for multi-barrelled guns that have been manufactured according to known techniques.

SUMMARY OF THE INVENTION

According to a first aspect of the invention, there is provided a method of manufacturing two or more gun barrels, the method comprising: machining a single metal block to form a barrel preform having the outer shape of at least a first gun barrel and a second gun barrel; drilling a first hole through the first gun barrel to form a first barrel bore; and drilling a second hole through the second gun barrel to form a second barrel bore.

Preferably, the machined barrel preform has the shape of a substantially finished set of barrels. This means that any final machining steps required to finish the barrels is minimal.

Preferably, drilling the first hole comprises: drilling to substantially half of the length of the first barrel from a first end of the first barrel; and drilling to substantially half of the length of the first barrel from a second end of the first barrel.

Preferably, drilling the second hole comprises: drilling to substantially half of the length of the second barrel from a first end of the second barrel; and drilling to substantially half of the length of the second barrel from a second end of the second barrel.

Preferably, machining the metal block comprises grinding. More preferably, grinding the metal block comprises creep feed grinding.

Preferably, drilling the first and/or second hole comprises rotating the barrel preform and a drill in opposing directions.

Preferably, the method further comprises honing the first and/or second holes.

Preferably, honing comprises inserting a honing tool into an end of a barrel and reciprocating the honing tool along the length of the barrel.

Preferably, the method further comprises forming the first and second barrels substantially parallel to each other.

Preferably, the method further comprises forming the barrels such that the separation of the end pieces of ammunition inserted into the first and second barrels is 1.5 mm or less.

Preferably, the method further comprises forming the barrels such that the separation of the end pieces of ammunition inserted into the first and second barrels is 0.5 mm to 1.5 mm.

Preferably, the method further comprises machining to provide integral fitments, such as a fore end loop, bifurcated lumps, wedges, and a sight mount.

Preferably, the method further comprises performing a hot blacking process.

Preferably, the metal block comprises an ordinance quality steel alloy or other suitable gun grade metal. Ordinance quality steel is a high-alloy steel having around 0.4% wt carbon, 1% wt manganese, 0.25% wt molybdenum, 1% wt chromium and trace amounts of phosphorous and sulphur. Higher grade ordinance steel containing more carbon, typically at 0.5% wt, is also suitable.

Preferably, the steel alloy is a Cr—Mo alloyed steel supplied in a hardened and tempered condition. Such steel offers good machinability and uniform hardness.

Preferably, the hardness of the metal block is at least 245 HB, more preferably between 285 and 340 HB.

According to a second aspect of the invention, there is provided gun barrels manufactured according to the method of the first aspect.

According to a third aspect of the invention, there is provided a gun with barrels according to the second aspect.

BRIEF DESCRIPTION OF THE DRAWINGS

Embodiments of the invention will now be described by way of example only, with reference to the accompanying drawings, in which.

DETAILED DESCRIPTION

Embodiments of the invention, as described herein with reference to the accompanying drawings, provide a new method for manufacturing gun barrels for multi-barrelled guns that solves at least some of the above-identified problems.

In the method according to embodiments, two or more barrels are machined out of the same single metal block. The outer shape of the barrels is formed and the holes of the barrels are then drilled through the formed outer shape. The plurality of barrels, and their attachment to each other, are all formed directly from the fashioning of the metal block.

Embodiments differ from known manufacturing techniques because the outside of the barrels is formed before the holes are drilled and each barrel is not formed separately and then soldered together.

One of the advantages of embodiments is that no soldering operation is required to attach the barrels to each other and so the straightness of the barrels is not degraded by such further heat treatment. Other advantages include it being possible to form the barrels closer together and parallel to each other, which increases their accuracy and usability.

Figure 1:
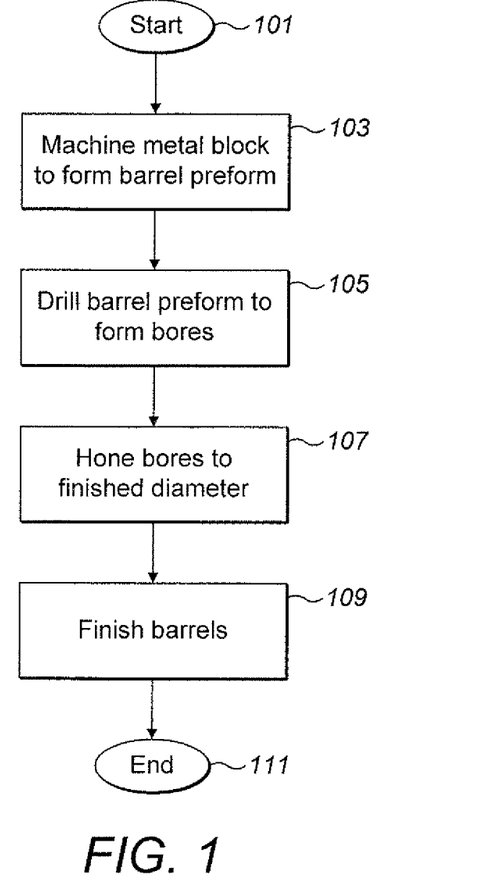
FIG. 1 shows the steps of a process according to an embodiment of the invention.

According to preferred embodiments, the steps for manufacturing the barrels from appropriate starting materials are shown in FIG. 1.

The process starts at step 101.

In step 103, a metal block is machined to generate a preform that is the outer shape of at least a first gun barrel and a second gun barrel.

In step 105, holes are drilled in the preform.

In step 107, the drilled holes are honed.

In step 109 finish operations are performed.

In step 111 the process ends.

Implementations of these steps according to preferred embodiments are described in detail below.

Starting Materials

The starting material for the manufacturing process is a solid block of metal. The metal block may have a mass of between 10 kg and 30 kg, but typically between 20 kg and 27 kg, depending on the gauge of the barrels. The dimensions of the metal block must be such that the metal block is large enough for at least the barrels to be machined from the metal block. Preferably, the metal block would be large enough so that the entire barrel set, including any rib, fore end loop or any other attachments to the barrels, to also be machinable from the same metal block.

In a preferred embodiment, the metal block is an ordinance quality Cr—Mo steel alloy. Ordinance quality steel of this type is a high-alloy steel having around 0.4% wt carbon, 1% wt manganese, 0.25% wt molybdenum, 1% wt chromium and trace amounts of phosphorous and sulphur. The steel is supplied in a hardened and tempered condition so that no further heat treatment is required. Such steel offers good machinability and uniform hardness. Preferably, the hardness of the metal block is at least 245 HB, more preferably between 285 and 340 HB.

Suitable such metal blocks that meet the above-described requirements are commercially available. In addition, a person skilled the art would know how to produce a metal block that had the required properties of for this form of ordinance.

Form Exterior of Barrels

A solid block of metal is machined into a preform of the exterior shape of at least two gun barrels. The machining is preferably performed using a creep feed grinding process as this does not result in a significant change in the mechanical properties of the metal. More particularly, a creep feed grinding process achieves a good surface finish whilst maintaining geometric tolerances. It is a low stress process capable of maintaining consistent contact forces with the metal being machined. The process does not result in significant distortion of the machined metal or significantly induce stresses therein. Preferably, the barrels are held with magnets to keep them straight and stable during the creep feed grinding process. Although creep feed grinding is a preferred process, any other type of grinding process, milling process, or other techniques, could also be used. As shown, in a preferred embodiment the machined barrel preform has the shape of a substantially finished set of barrels. This means that the final machining steps required to finish the barrels is minimal.

The preform is of at least two barrels, spaced apart from each other by a predetermined distance. The length of the preformed barrels is preferably determined in dependence on a specific user's requirements, i.e. it is dependent on their body size. The width and height of the preformed barrels is dependent on the gauge, or calibre, of the ammunition that is to be used. Typical dimensions for a 12 bore over-and-under shotgun are 762 mm long×39 mm wide×53 mm high.

A particularly preferred construction is of a two barrel arrangement in which both of the barrels are formed substantially parallel with each other. However, the process can also be used to machine a preform of converging barrels.

For parallel barrels, the barrel separation is such that the distance between the rims of cartridges, or bullets, inserted into each barrel is typically 1.5 mm or less. How close the barrels can be made to each other is dictated by the dimensions of the ammunition and the barrels could be made so close to each other that the rims of the ammunition abut each other. If rimless ammunition is used, an even closer barrel spacing could be realised. To allow for manufacturing tolerances, and to accommodate potential future designs of ammunition, the spacing between the rims of the ammunition is preferably not less than 0.5 mm.

Drill Bores

After the exterior shape of the barrels has been machined, the holes of the barrels are drilled.

To drill the barrels, the preform is held by a clamping arrangement. Preferably the clamping arrangement is a plurality of clamps arranged in a linearly-spaced configuration. The number of clamps may be, for example, six. Each clamp of the clamping arrangement preferably contains a method of maintaining an even and monitored clamping pressure, as possible with clamps that are spring, air or hydraulic pressure loaded. This ensures that the clamping force applied to hold the formed exterior of the barrels in place is large enough to securely hold the barrels in place but is not sufficient to significantly deform their shape or induce a change in material properties.

A first drilling operation is performed through a first end of a first one of the barrels. The drill is arranged to enter the barrel centrally, relative to the already formed exterior of the barrel, and the entry point is typically correct to within 5 μm. The barrel is drilled to half, or just over half, of its length.

A second drilling operation is then performed through a second end of the first one of the barrels. Again, the drill is arranged to enter the barrel centrally, relative to the already formed exterior of the barrel. The barrel is drilled to half, or just over half, of its length.

A second one of the barrels is then formed by repeating the above-described drilling operations for the first one the barrels.

The drilling operations can alternatively be performed in a different sequence. For example, the same ends of the first and second barrels could be drilled before the other ends of the first and second end of the barrels are drilled.

A preferred technique for drilling each bore is to counter rotate the drill bit and the barrel preform. This results in the bores being drilled straighter.

Hone Bores

After the drilling operation, problems experienced include each drilled bore not being straight and smooth as well as the bores that are drilled from either end of a barrel not aligning exactly at the position in the middle of the barrel where the bores meet. These problems are demonstrated by FIG. 2 that is a cross-section along the length of two bores of a double barrel. The upper bore is an exemplary demonstration of a newly drilled bore that is not straight, not smooth and has misaligned bores.

To solve the above problems, a honing process is performed. A honing process is a process that uses a honing tool, such as the honing tool shown in FIG. 3, to straighten and smooth the bores as well as correct any misalignment of the bores.

Figure 3:
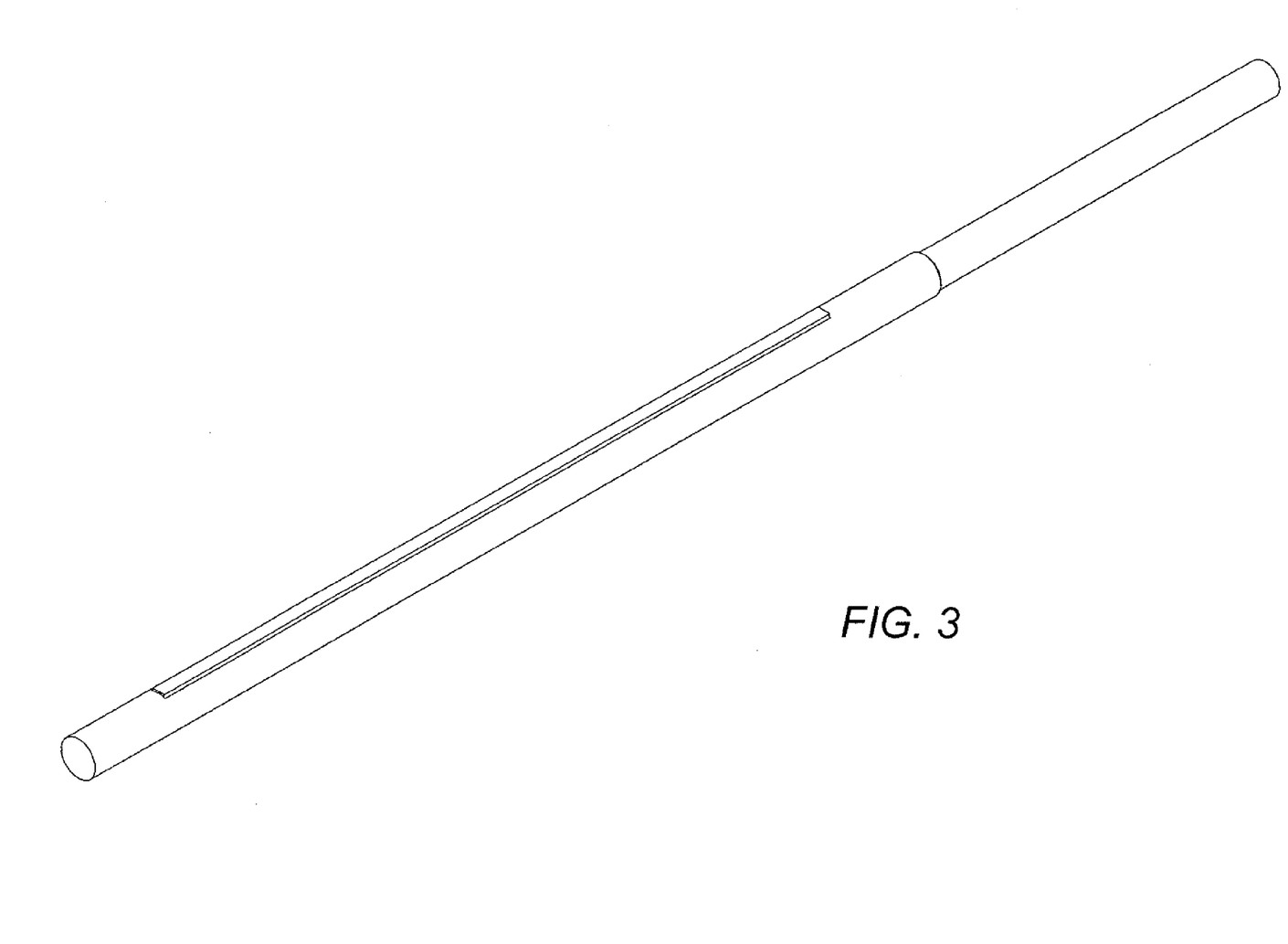
FIG. 3 shows a honing tool.

In the honing process, the honing tool is inserted into an end of the barrel and longitudinally reciprocated and rotated along the longitudinal axis of the bore. An abrasive element of the honing tool is arranged in a pocket in the head of the honing tool with a tapered wedge beneath it. The tapered wedge is controlled by a CNC (computer numerically controlled) axis and is moveable along the axis of the honing tool so as to control the protrusion of the abrasive element out of the honing tool into the bore. The honing tool therefore expands to remove material from, and thereby straighten, smooth and align, the bore. Preferably, the honing tool has a length of 280 mm or longer. Increasing the length of the honing tool ensures that the honing tool is held more closely by the entry hole in the end of the barrel and therefore the longitudinal axis of the formed hole is substantially parallel with the already formed exterior surfaces of the barrel preform.

Figure 2:
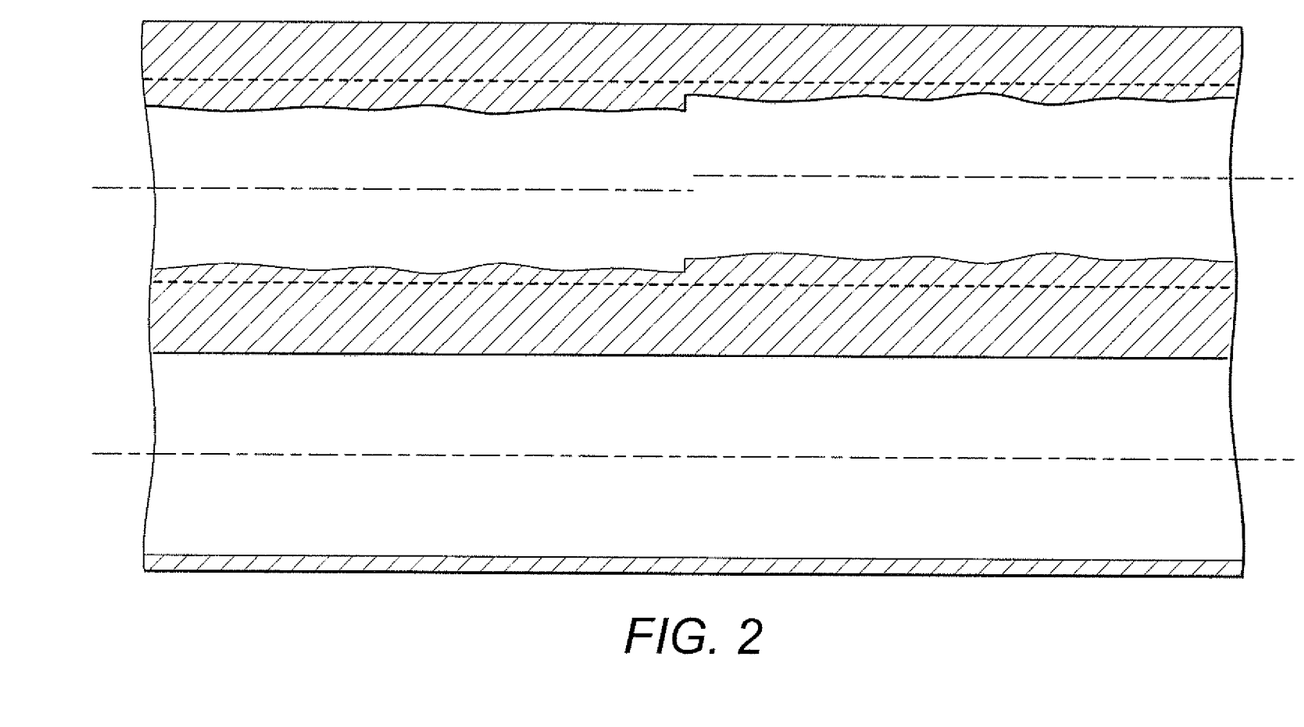
FIG. 2 is a side on view of barrels before and after honing.

The lower bore in FIG. 2 shows a bore after the honing process. As a result of the honing, the bore is now straight and smooth, with the oppositely drilled bores aligned.

Finishing Operations

Once all of the barrels have been formed by the above-described operations, the barrels are further machined as necessary to ensure that they fit to the other parts of a shotgun. Preferably, the same single piece of steel that the barrels have been machined from is further machined to provide the necessary fitments, such as a fore end loop, bifurcated lumps which fit into the action draws, wedges, sight mount etc. It is advantageous to make the fitments integral with the barrels as they will then be strongly attached. However, this is in no way essential and the fitments could alternatively be manufactured separately from the barrel and then attached to the barrel.

Preferably, a hot blacking process is performed. This is more resilient than a cold blacking process. Known techniques typically perform a cold blacking process and hot blacking is avoided due to the resulting seepage of chemicals into soldered ribs, which causes rusting. Since the barrels according to embodiments are not attached by soldered ribs, no such problems are caused by the hot blacking process. A hot blacking process does not affect the mechanical properties of the metal to the extent that the straightness of the barrels is compromised.

Finishing operations also include polishing the barrels and any other operations as would be known to a person skilled in the art. The finished barrels typically have a mass of about 1.3 kg.

FIGS. 4 to 10 provide representations of finished gun barrels according to embodiments. The barrels have been manufactured for the exemplary application of an over-and-under shotgun.

Figure 4:
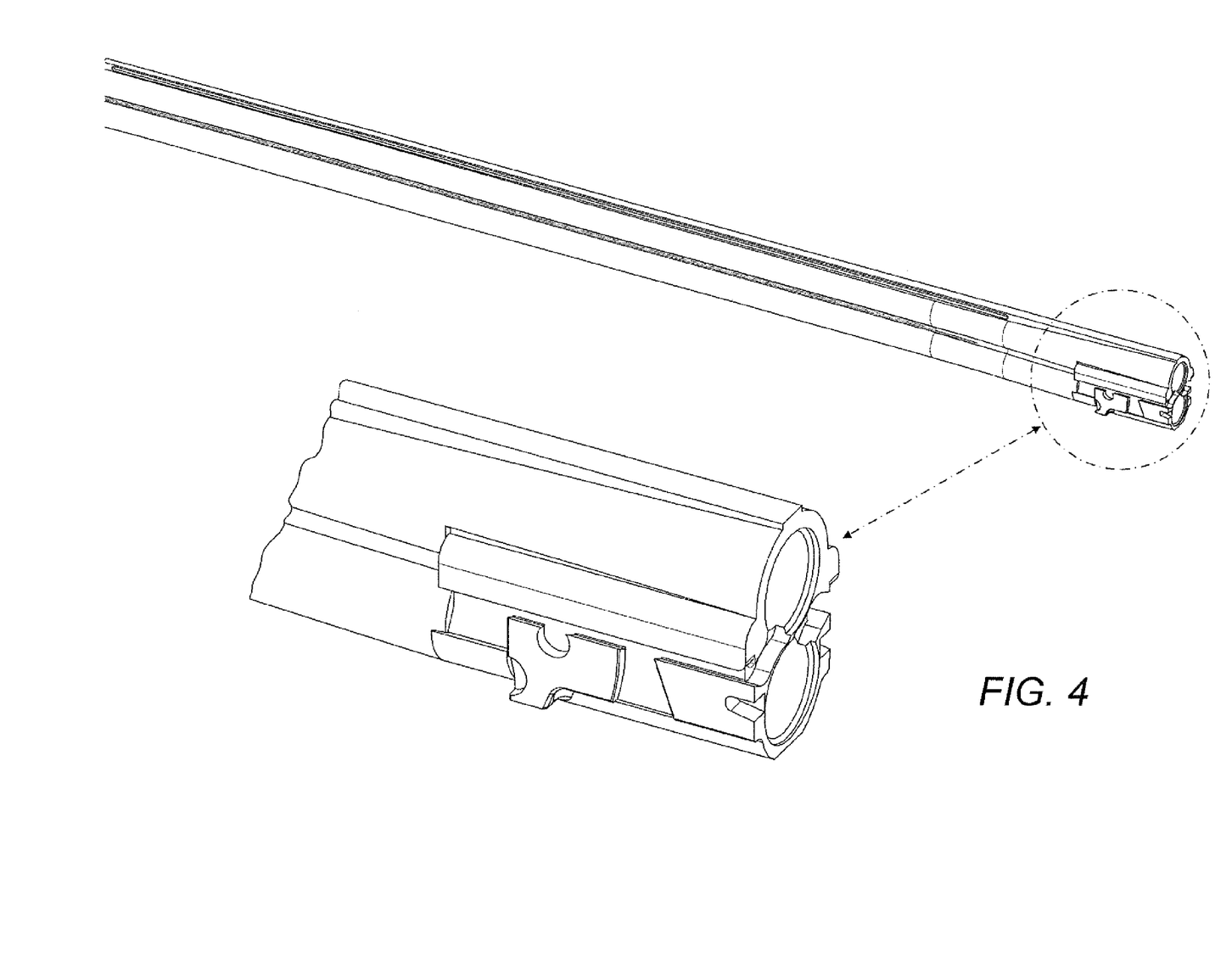
FIG. 4 shows the finished barrels and some of the fitments that may be provided at one end of the barrels according to an embodiment of the invention.

FIG. 4 shows the finished barrels and some of the fitments that may be provided at one end of the barrels.

Figure 5:
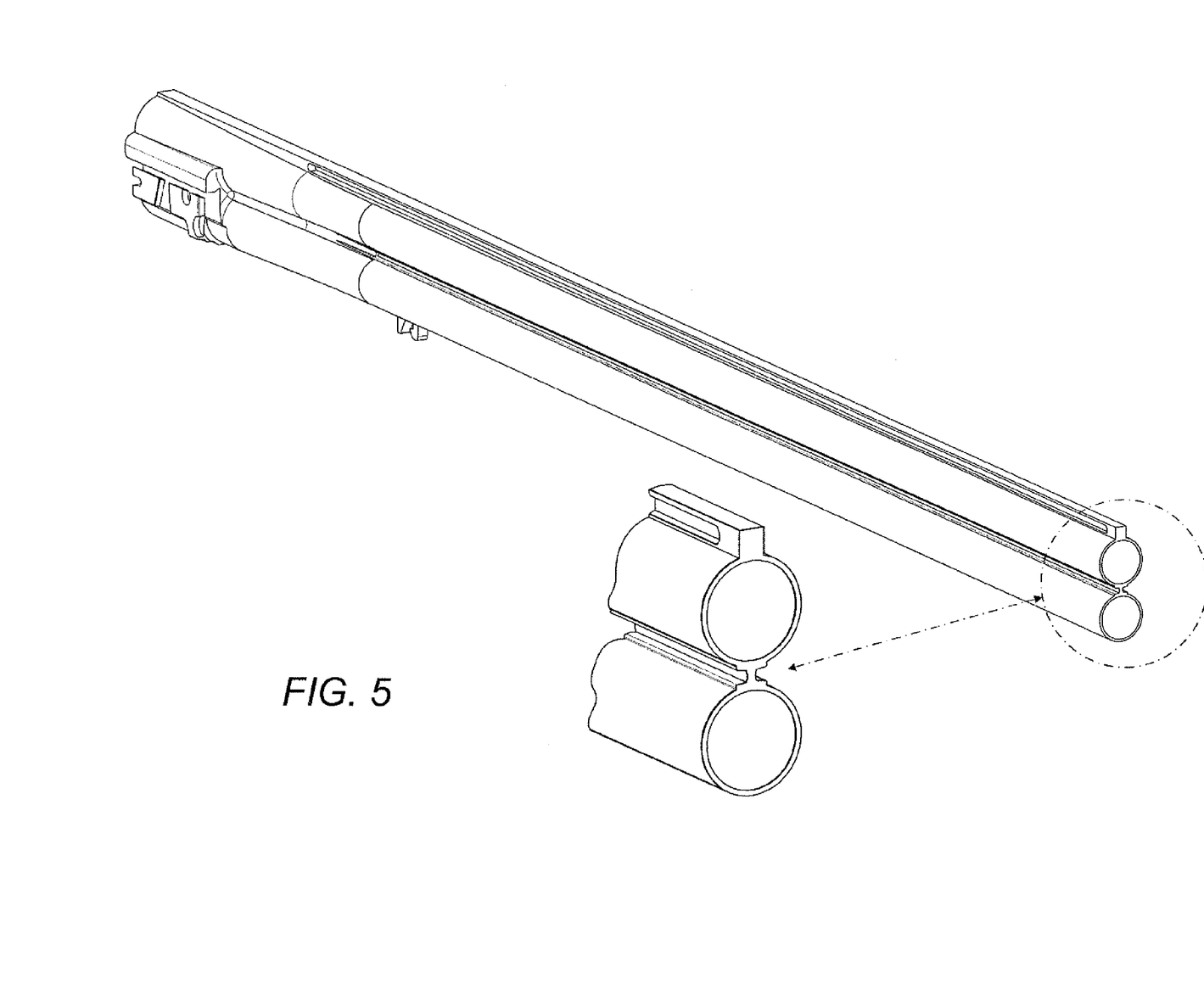
FIG. 5 shows the finished barrels and, in particular, the gun sight at the other end of the barrels according to an embodiment of the invention.

FIG. 5 shows the finished barrels and, in particular, the gun sight at the other end of the barrels.

Figure 6:
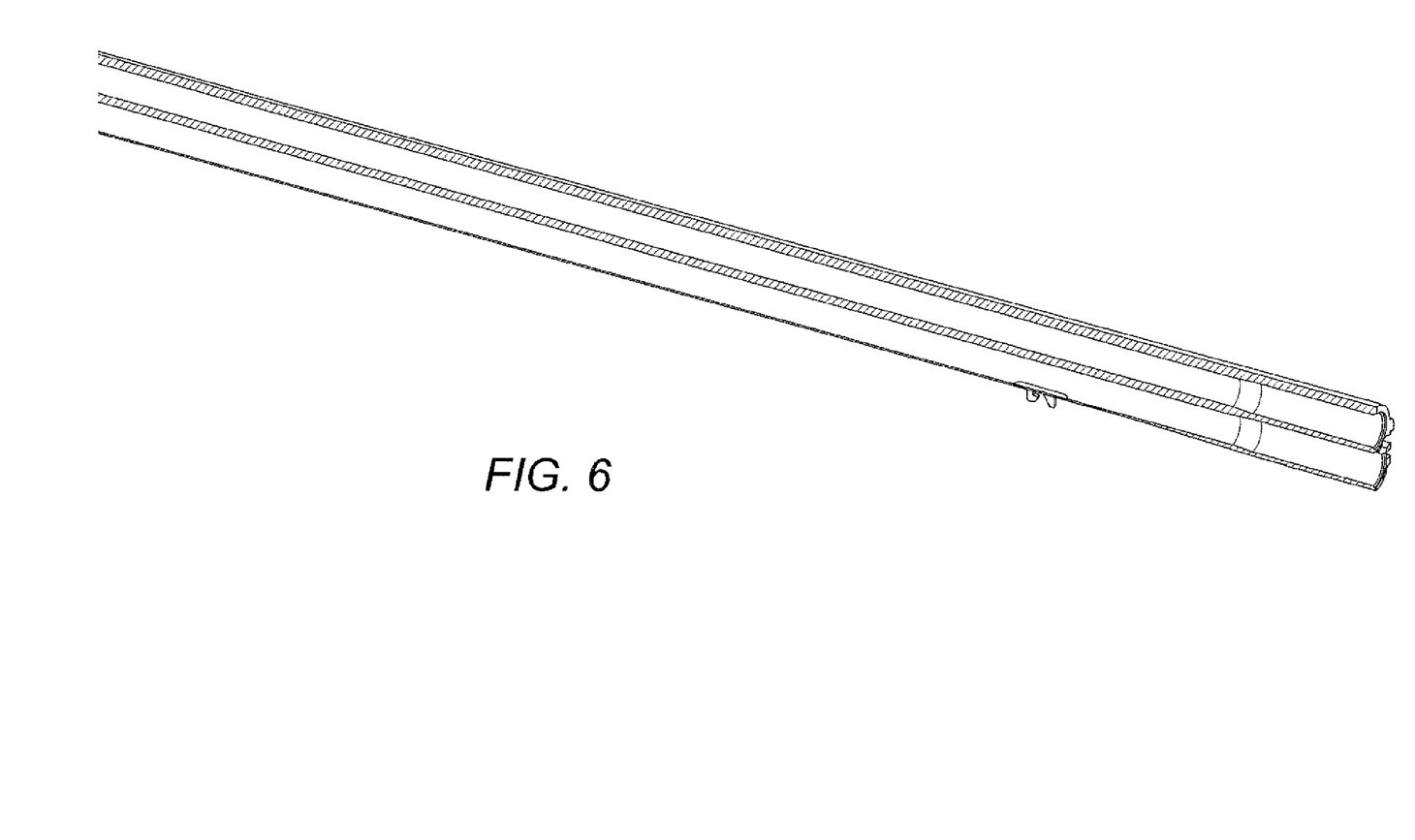
FIG. 6 shows a cross-section through the barrels according to an embodiment of the invention.

FIG. 6 shows a cross-section through the barrels. The close spacing and parallel configuration of the barrels are clear.

Figure 7A:
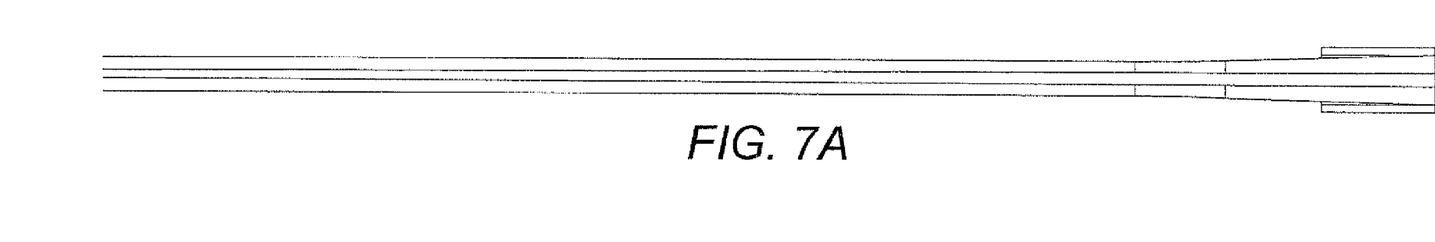
FIG. 7a shows a view from above the barrels according to an embodiment of the invention.

FIG. 7a shows a view from above the barrels. A gun sight is provided along the length of the barrels.

Figure 7B:
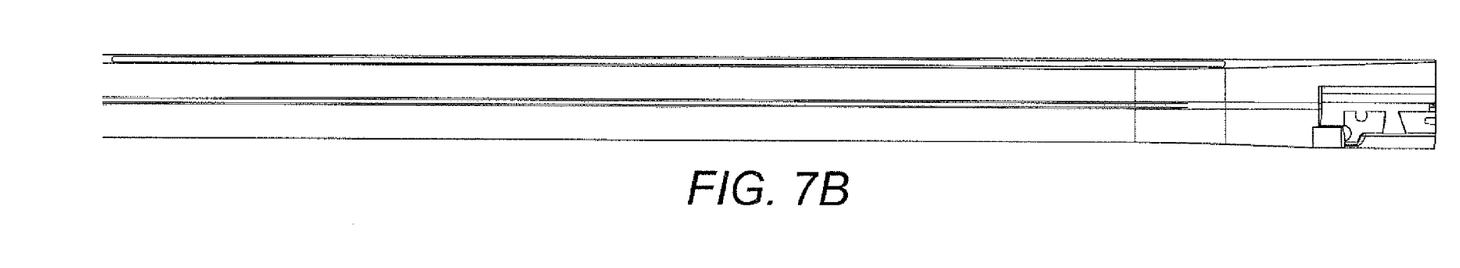
FIG. 7b shows a side on view of the barrels according to an embodiment of the invention.

FIG. 7b shows a side on view of the barrels.

Figure 7C:
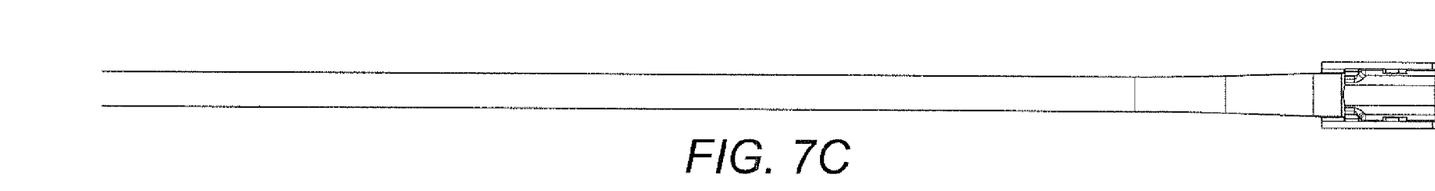
FIG. 7c shows a view from below the barrels according to an embodiment of the invention.

FIG. 7c shows a view from below the barrels.

Figure 8A:
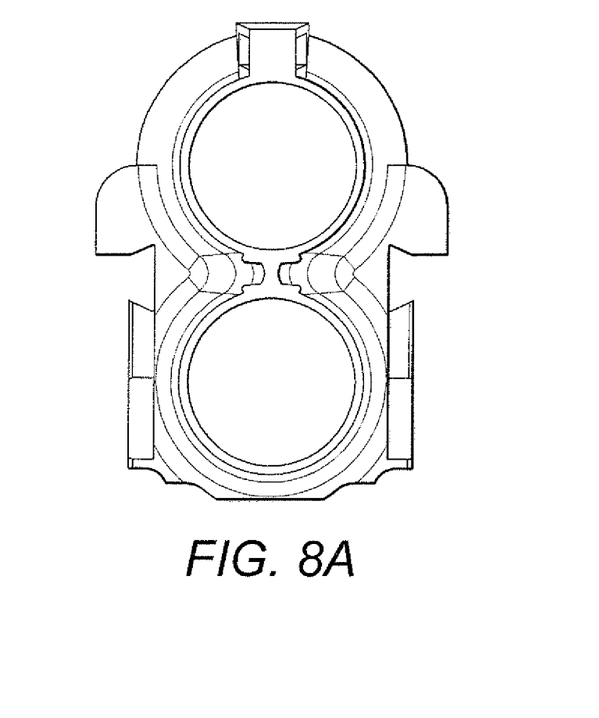
FIG. 8a is an end on view of the barrels according to an embodiment of the invention.
Figure 8B:
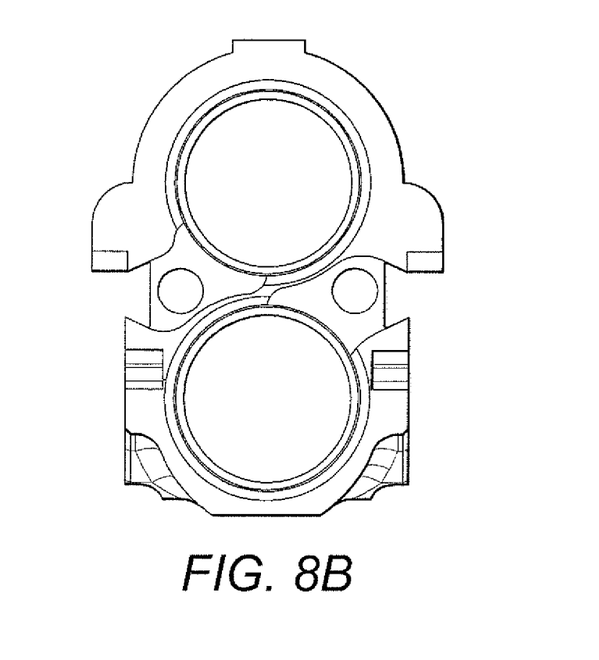
FIG. 8b is an end on view of the barrels according to an embodiment of the invention.

FIGS. 8a and 8b are end on views of the barrels that demonstrate their close spacing.

Figure 9:
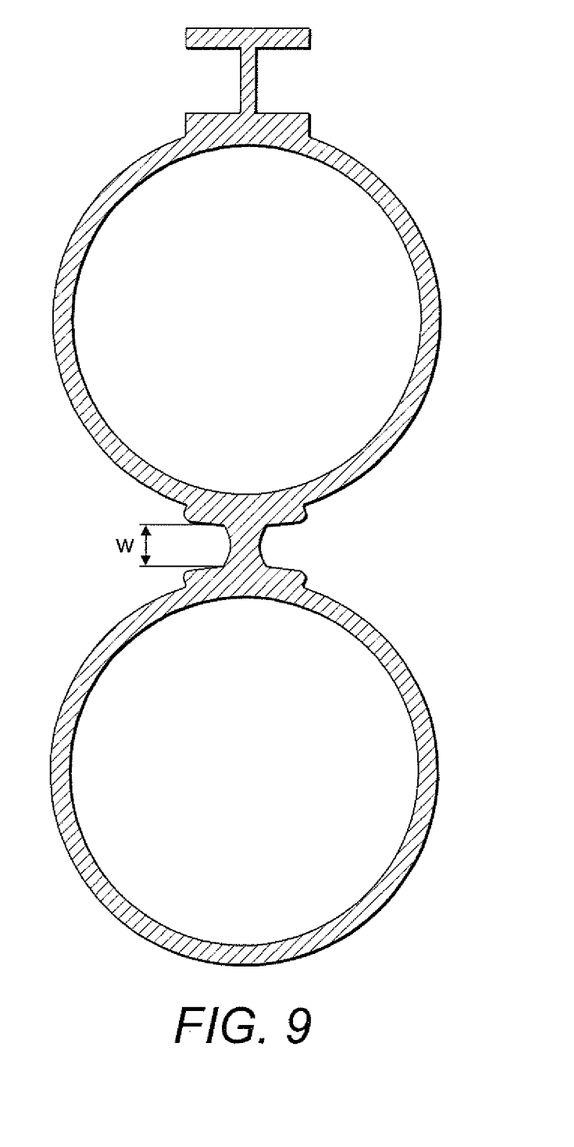
FIG. 9 is an end on view of the barrels according to an embodiment of the invention.

FIG. 9 is an end on view of the barrels. The dimension w is the separation of the rims of cartridges inserted into each barrel. As explained above, w is preferably 0.5 mm to 1.5 mm.

Figure 10:
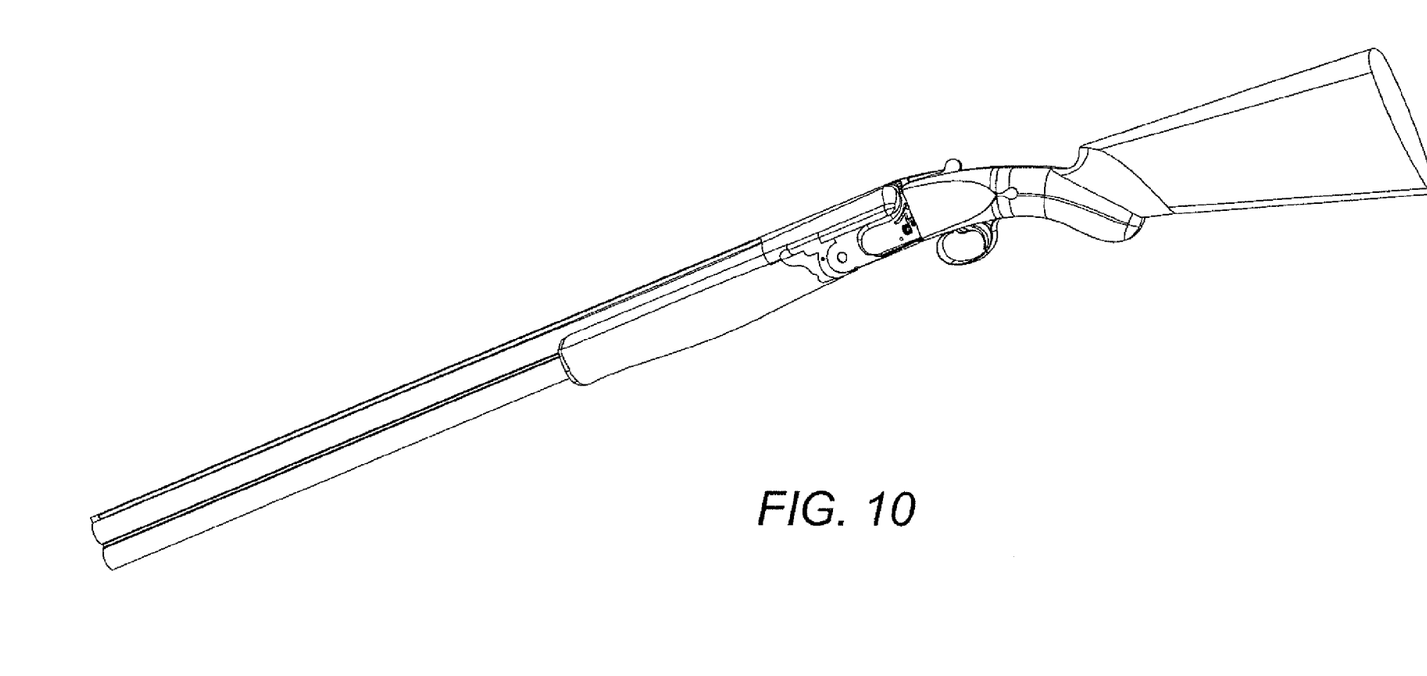
FIG. 10 shows a gun with barrels according to embodiments.

FIG. 10 shows a gun with barrels according to embodiments.

Advantages

Some of the advantages of embodiments are set out below with exemplary reference to two barrels for an over-and-under shotgun that has been manufactured according to embodiments.

In known manufacturing techniques, each barrel of a two barrel shotgun is formed separately and the two barrels are then soldered together with a central rib. The soldering process is complicated and, due to the temperatures reached, it is not possible to avoid further heat treatment of the metal. The soldering operation therefore alters the mechanical and physical properties of the barrels. In particular, the soldering process distorts the metal and the barrels are therefore less straight after the soldering process.

A further problem with soldering is that the soldering process inherently imposes a practical limitation on how closes the barrels can be to each other. The closer the desired spacing of the barrels, the more difficult the soldering becomes.

An advantage of manufacturing barrels according to the techniques described herein is that the plurality of barrels, and their attachment to each other, are all formed out of the same single metal block. A soldering process to attach the barrels to each other is therefore avoided and there is no further heat treatment of the metal.

The barrels according to embodiments do not need to be made with a central rib and it is possible to form barrels which are extremely closely spaced. The lack of a central rib, or use of a thinner central rib than possible if the barrels had been soldered together, advantageously allows the heat generated when the gun is fired to disperse evenly and quickly. There is also no requirement for a vented rib as there is no trapped hot air from a soldered connection causing heat to build up.

A problem experienced by known two barrelled shotguns is that there is a need to compensate for the lack of accuracy introduced by the separation of the barrels. They are therefore constructed with the longitudinal axes of their barrels angled towards each other. By angling the axes towards each other, projectiles from each of the barrels converge on the same position at a distance from the gun. It is known for manufactures to over compensate with the convergence so that the actual convergence, is about 5-6 m in front of the gun, and the more convergence applied the more compensation by a user is needed.

Embodiments both allow the barrels to be made closer to each other, and the axis of each barrel to be made straighter, than possible with known manufacturing techniques. In a particularly preferred embodiment, two barrels are formed substantially parallel with each other. The close spacing of the barrels ensures that the spread of projectiles from each barrel substantially overlap and so there is no significant loss of accuracy due to the barrels not converging.

By way of comparison, a typical separation between the rims of cartridges inserted into each barrel of a two barrel shotgun manufactured according to known techniques is 4-6.5 mm whereas the separation according to a preferred embodiment is typically 0.5-1.5 mm.

The straight, cylindrical and smooth form of barrels according to embodiments, not only allows the barrels to be positioned close together, but also improves the accuracy of the barrels. The straight, cylindrical, smooth and substantially parallel nature of the barrels also provides the advantage of the perceived recoil being reduced. A linear recoil, as results from straight, cylindrical, smooth and substantially parallel barrels, has a recoil only along the longitudinal axis of the gun, with no component introduced by the barrels being angled toward each other. This linear recoil is therefore perceived by a user as less than if the barrels are angled towards each other. In addition, the muzzle flip on firing is also reduced.

A further advantage of manufacturing the barrels from a single metal block is that they are inherently stronger than barrels that have been soldered together. A soldered connection will inherently have weak points in the structure due to the construction from separate parts.

Embodiments also allow barrels to be made that weigh less than barrels manufactured according to known techniques since they do not require a heavily soldered central rib.

In a preferred embodiment, the barrels are made with an increased wall thickness. Although this adds weight to the barrels, the barrels are still about the same weight as barrels manufactured according to known techniques as there is no central rib. Advantageously, this increases the strength of the barrels and they are well balanced.

As described above, in a preferred embodiment parallel barrels are manufactured. This is a particularly preferred configuration for the construction of two barrels for a over-and-under shotgun. In another preferred embodiment, that is particularly preferred for side-by-side shotguns, the barrels are made to slightly converge with each other. In this embodiment, the separation between the rims of cartridges inserted into each barrel would preferably be about 0.5-0.7 mm and the convergence applied is therefore a lot less than that applied with known shotguns.

Although the above advantages have been described with reference to the manufacture of two barrel shotguns, embodiments are in no way restricted to the manufacture of guns with two barrels and the techniques of embodiments can be used to manufacture guns with any number of barrels. In addition, the techniques of embodiments can be used to manufacture the barrels of any type of gun, including rifles.

In the above described embodiments, the drilling operation was described as being performed by drilling to, or just over, half the length of each barrel from both ends of each barrel. This advantageously, results in each drilled hole being closely aligned with the already formed outside of the barrel. In an alternative embodiment, each hole is formed by a single drilling operation along the entire length of the barrel. This has the advantage of being quicker and simpler than drilling from both ends. The honing process would preferably still be performed to improve the straightness and smoothness of the barrels.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A method of manufacturing a set of integral gun barrels, the method comprising:
    a first step of machining a single metal block to form a barrel preform having the finished outer shape of at least a first gun barrel and a second gun barrel, wherein the barrel preform has a solid cross section comprising an external configuration having a contiguous but distinct first circular barrel section and a second circular barrel section; and
    a second step, which is performed after the first step, of drilling a concentric bore in each of the first and second circular barrel sections of the barrel preform to form a first gun barrel and a second gun barrel, respectively.

2. The method of claim 1, wherein drilling the first hole comprises:
    drilling to substantially half of the length of the first barrel from a first end of the first barrel; and
    drilling to substantially half of the length of the first barrel from a second end of the first barrel.

3. The method of claim 1, wherein drilling the second hole comprises:
    drilling to substantially half of the length of the second barrel from a first end of the second barrel; and
    drilling to substantially half of the length of the second barrel from second end of the second barrel.

4. The method of claim 1, wherein machining the metal block comprises grinding.

5. The method of claim 4, wherein grinding the metal block comprises creep feed grinding.

6. The method of claim 1, wherein drilling the first and/or second hole comprises rotating the barrel preform and a drill in opposing directions.

7. The method of claim 1, further comprising honing the first and/or second holes.

8. The method of claim 7, wherein honing comprises inserting a honing tool into an end of a barrel and reciprocating the honing tool along the length of the barrel.

9. The method of claim 1, further comprising forming the first and second barrels substantially parallel to each other.

10. The method of claim 1, further comprising forming the barrels such that the separation of the end pieces of ammunition inserted into the first and second barrels is 1.5 mm or less.

11. The method according to claim 10, further comprising forming the barrels such that the separation of the end pieces of ammunition inserted into the first and second barrels is 0.5 mm to 1.5 mm.

12. The method of claim 1 further comprising machining to provide integral fitments, such as a fore end loop, bifurcated lumps, wedges, and a sight mount.

13. The method of claim 1, further comprising performing a hot blacking process.

14. The method of claim 1, wherein the metal block comprises ordinance quality steel alloy.

15. The method of claim 14, wherein the metal block has a hardness of at least 245 HB, and preferably in the range of 285 to 340 HB.

16. The method of claim 1, wherein the hardness of the metal block is uniform and remains substantially unchanged by the manufacturing steps.

17. Gun barrels manufactured according to the method of claim 1.

18. A gun with barrels according to claim 17.

19. The method of claim 8, wherein the honing tool is rotated along a longitudinal axis of the bore.

20. The method of claim 14, wherein the steel alloy is a Cr—Mo alloyed steel supplied in a hardened and tempered condition.

21. The method of claim 14, wherein the honing tool has a length of 280 mm or longer.

22. The method of claim 1, wherein the first circular barrel section and the second circular barrel section of the barrel preform are spaced apart by a central rib.

23. A method of manufacturing a set of integral gun barrels, the method comprising:

A first step of machining a single metal block to form a barrel preform having the finished outer shape of at least a first gun barrel and a second gun barrel, wherein the barrel preform has a solid cross section comprising a first circular barrel section and a second circular barrel section; and A second step, which is preformed after the first step, of drilling a concentric bore in each of the first and second circular barrel sections of the barrel preform to form a first gun barrel and a second gun barrel respectively, wherein the first circular barrel section and the second circular barrel section of the barrel preform are spaced apart by a central rib.

* * * * *